Jan. 25, 1966 B. A. WARD ETAL 3,231,678

SUBSCRIBER CONTROLLED CONFERENCE CIRCUIT

Filed June 25, 1962 2 Sheets-Sheet 1

INVENTORS B. A. WARD
A. ZAROUNI

BY R. C. Winter
ATTORNEY

SUBSCRIBER CONTROLLED CONFERENCE CIRCUIT

Filed June 25, 1962 2 Sheets-Sheet 2

INVENTORS B. A. WARD
A. ZAROUNI

BY R. C. Winter
ATTORNEY

United States Patent Office 3,231,678
Patented Jan. 25, 1966

3,231,678

SUBSCRIBER CONTROLLED CONFERENCE CIRCUIT

Brendan A. Ward, South Plainfield, N.J., and Alfred Zarouni, Brooklyn, N.Y., assignors to Bell Telephone Laboratories, Incorporated, New York, N.Y., a corporation of New York Filed June 25, 1962, Ser. No. 204,764
24 Claims. (Cl. 179—18)

Figure 1:
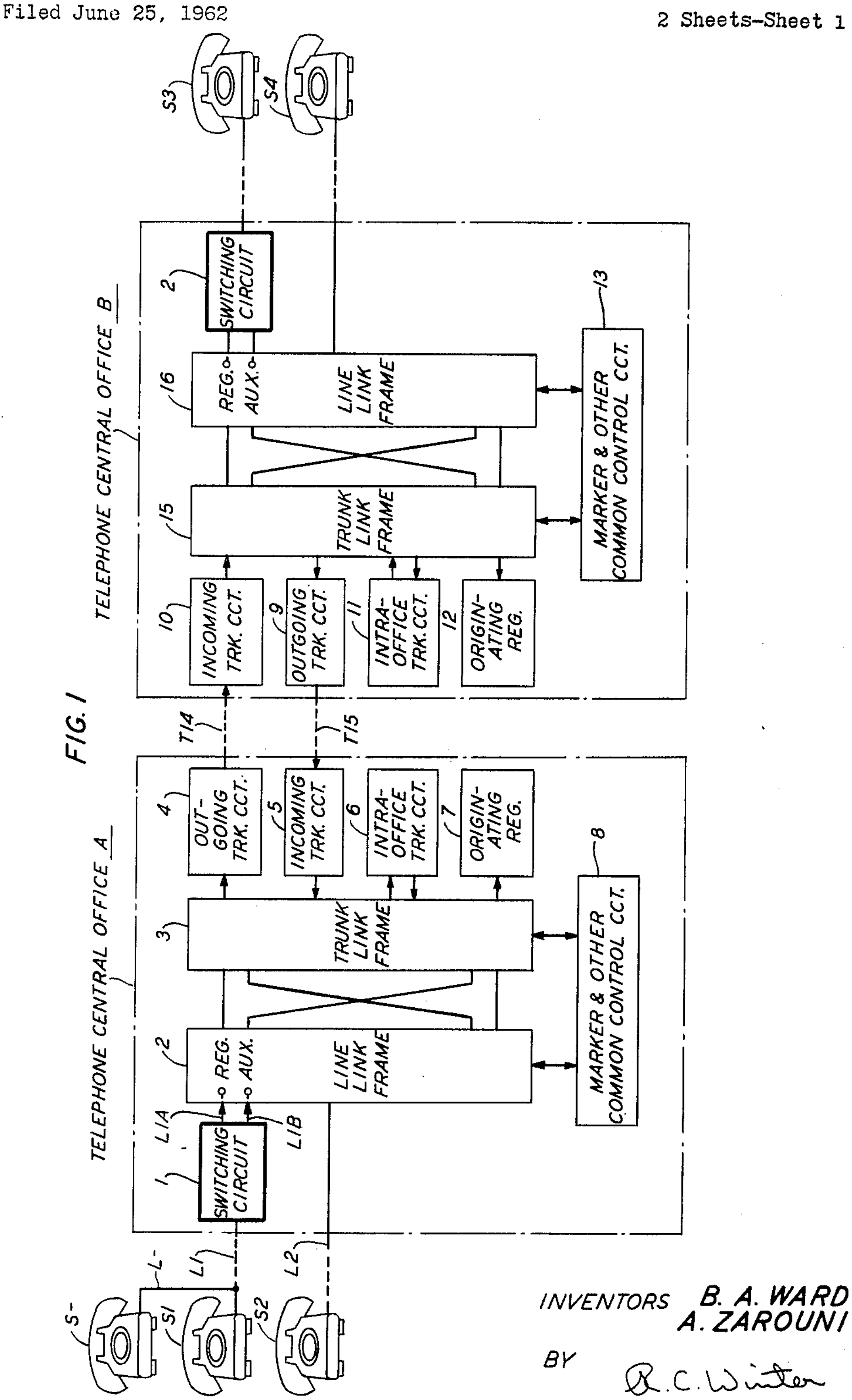

This invention relates generally to telephone switching systems and particularly to subscriber controlled conference calls and subscriber controlled transfer of calls within such systems.

Since the advent of automatic telephone switching systems, there has been an increasing demand to permit subscribers to utilize the inherent capabilities of such systems without requiring the assistance of an operator. A recent advance in this regard is the extension of subscriber controlled direct distance dialing to most of the United States. Another example is the provision of direct inward dialing to Private Branch Exchanges to permit direct dialing of extensions. In the latter instance it was recognized that, in the absence of an operator, arrangements should be provided to enable the called extensions to transfer the call to another extension when necessary. This need was met by the arrangement disclosed in E. R. Fulwiler, et al. Patent 3,115,552 issued December 24, 1963. The disclosure provides this feature by modifying the PBX incoming trunks to recognize a transfer request by the called station and by providing equipment for establishing a connection to the extension to which the transfer is to be made. A feature, such as this, renders the subscriber's telephone usage more convenient and more flexible. However, the greatest proportion of telephone stations are not provided with PBX service, but rather receive and initiate calls via direct or party lines to a telephone central office.

It has become increasingly apparent that the ability to automatically transfer calls should be extended to these stations. Non-PBX business lines have a need for this service for the same reasons as PBX stations; residential lines, on the other hand, would find such a feature extremely attractive from a standpoint of convenience. It has also been recognized that the call transfer feature combined with a station controlled conference feature would have a ready market as a premium service for which the subscriber pays a small additional charge.

Modification of incoming trunks to provide transfer service in a PBX, as disclosed in the Fulwiler patent, is a logical expedient in a PBX environment since the number of trunks involved is quite limited with respect to a central office of even moderate size. However, to extend this service to non-PBX stations in a central office in the same manner would be economically prohibitive. Further, since the service would probably be extended, initially, only to those requesting it as a premium service, stations with the service and those without the service may coexist in a telephone central office for an extended period. Accordingly, in order to extend call transfer and conference call facilities to non-PBX stations, equipment must be provided which is sufficiently simple that it may economically be provided on a per line basis.

In view of the foregoing, a general object of this invention is to make it economically possible to provide subscriber controlled call transfer and conference call facilities in a telephone system where such service is required by non-PBX subscribers.

Another object is to permit a subscriber to control such facilities in an exceedingly simple manner.

Another object is to provide a single circuit which is capable of simultaneously providing both the call transfer and the conference call services.

Another object is to provide equipment that need only be associated with those subscriber lines desiring the special services.

A further object is to provide these services without requiring modification of any central office circuits external to the line circuit.

These and other objects of the invention are attained in accordance with an exemplary embodiment wherein the subscriber's line is terminated at the input of a switching circuit at the central office. The output of the switching circuit comprises a regular and an auxiliary line appearance for the subscriber's line.

The switching circuit's operation may advantageously be explained in terms of eight relays which include two slow-operate, marginal relays, one of which is bridged across the regular line appearance and the other of which is bridged across the auxiliary line appearance. These latter two relays have been selected to be slow operate so as to hold over dial pulses, and marginal so as to respond only to a flashing of the switchhook to enable and control the call transfer and conference call features. Originating and terminating calls to the special service subscriber line are completed in the conventional manner. However, a switchhook flash by the special service subscriber enables the switching circuit by operating the aforesaid marginal relay. A third relay thereupon operates, bridging a holding shunt across the regular appearance to hold the connection and causing a bid for a new connection via the auxiliary appearance, which is established in response to dialing by the subscriber. A subsequent switchhook flash causes the interconnection of the regular and auxiliary appearance via the operation of the second aforesaid marginal relay.

An additional relay may advantageously be associated with each of the line appearance control (sleeve) leads. These relays perform the function of recognizing that common control circuits have responded to a request for service. The remaining three relays provide the supervising function of counting the switchhook flashes at the auxiliary appearance so that a third switchhook flash is recognized by the switching circuit as a request to restore the switching circuit to normal and also to provide general timing and control operations.

In accordance with one feature of the invention, a circuit comprises apparatus arranged to permit a special service station to control call transfer and conference call facilities whether the call originates with or terminates to that station.

In accordance with another feature of the invention, two interconnected stations equipped with this circuit may each independently and simultaneously add a station and converse in secrecy with the added station prior to their joining the existing connection.

In accordance with another feature of the invention, the circuit comprises apparatus arranged to permit withdrawal from the established connection by any of the participating stations and to allow the connection to remain established between any two remaining stations.

In accordance with another feature of the invention, the circuit includes apparatus bridged across a subscriber's regular and auxiliary line appearance which is unresponsive to dial pulses generated by the station, but is responsive to switchhook flashes from the station. More particularly, this apparatus comprises two slow-operate marginal relays.

In accordance with another feature of the invention, the circuit includes apparatus arranged to respond to a switchhook flash at the regular appearance to cause a bid for a dial tone connection at the auxiliary appearance. More particularly, this apparatus comprises a slow-operate marginal relay and a first relay connected to the regular appearance sleeve lead.

In accordance with another feature of the invention, the circuit includes apparatus which permits a station to add another station and to converse with that station in secrecy prior to adding it to the connection. More particularly, this apparatus comprises a first relay connected to the regular appearance sleeve lead.

In accordance with another feature of the invention, the circuit comprises eight relays arranged to provide the call transfer and conference call services to a multistation telephone line.

In accordance with another feature of the invention, the circuit includes apparatus which permits the special service station to release the added station by a subsequent flashing of the switchhook at the completion of a conference connection. More particularly, this apparatus comprises a slow-operate marginal relay, in conjunction with a first, second and third relay.

In accordance with another feature of the invention, the circuit comprises apparatus which provides a station with control of the call transfer and conference call features from the station regardless of the type of subset with which the station is provided.

Figure 2:
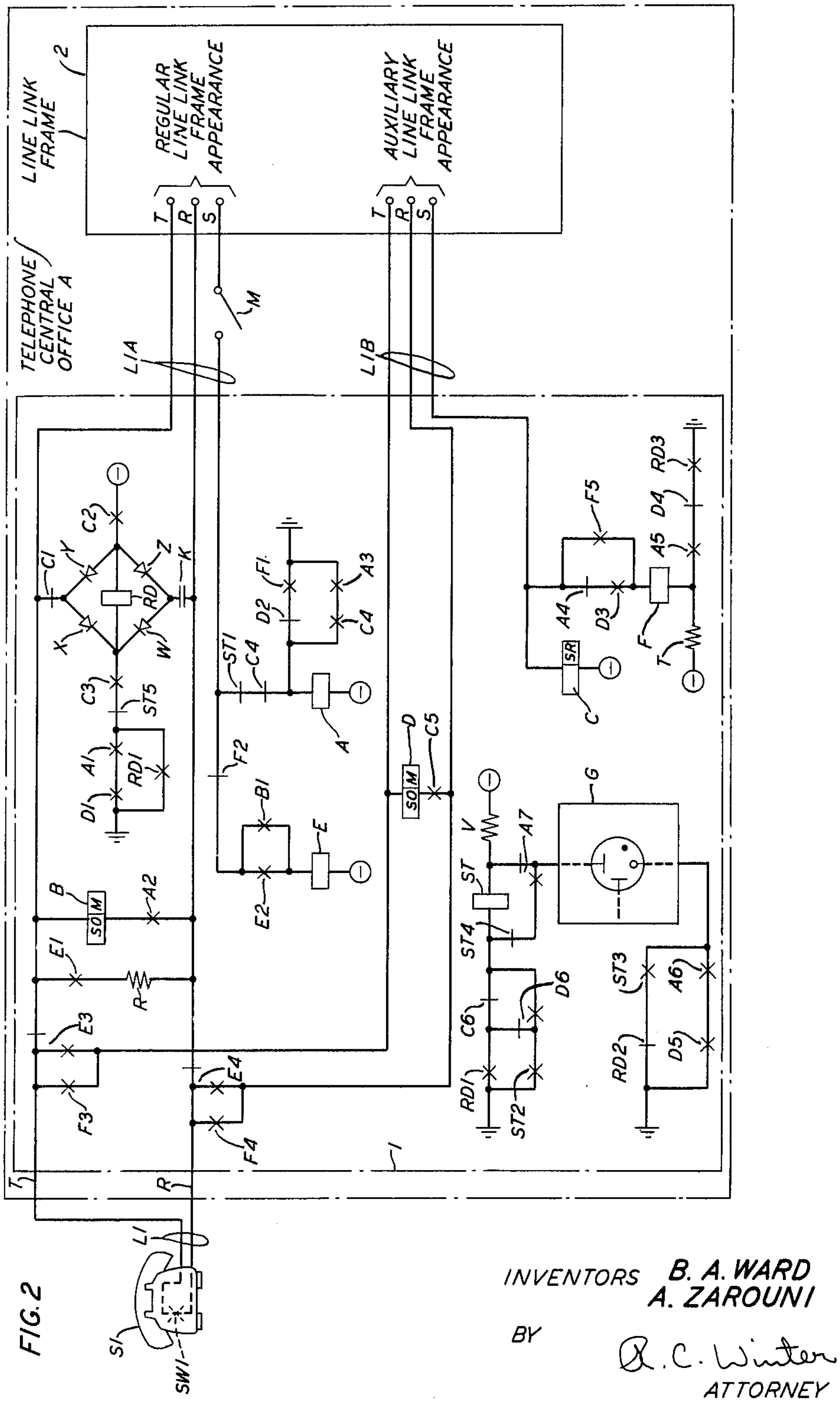

The foregoing objects and features, as well as others, of this invention will be more apparent from a consideration of the subsequent description and the drawing in which:

FIG. 1 is essentially a block diagram showing the interrelation of the components of the exemplary embodiment; and FIG. 2 shows in greater detail some of the components including one station, a switching circuit and a line link frame.

It will be noted that FIG. 2 employs a type of notation referred to as "detached contact" in which an "$x$" represents a normally open contact of a relay, and a single bar represents a normally closed contact of a relay; "normally" referring to the unoperated condition of the relay. The principles of this type of notation are described in an article entitled "An Improved Detached-Contact-Type of Schematic Circuit Drawing" by F. T. Meyer, in the September 1955 publication of American Institute of Electrical Engineers Transactions, Communications and Electronics, vol. 74, pages 505–513.

The station controlled conference circuit of the present invention may advantageously be incorporated in an automatic telephone system wherein common control circuits are employed to control the establishment of calls through a switching network. One such system is disclosed in A. J. Busch Patent 2,585,904, issued February 19, 1952. It is to be understood, however, that the present invention is not limited for use with a telephone system of this type but may be utilized with other types of switching systems.

The invention described herein is embodied in a telephone system of the type disclosed in the cited Busch patent. It is particularly concerned with apparatus in the switching circuits 1 and 2, which are represented by the blocks shown with heavy lines in FIG. 1. The other equipment units are neither shown nor described in detail, except where necessary for a complete understanding of the invention. The Busch patent may be consulted for a complete understanding of the construction and operation of components not covered in detail herein.

For the purpose of illustration, it is intended that the apparatus of line link frames 2 and 16, trunk link frames 3 and 15, outgoing trunks 4 and 9, incoming trunks 5 and 10, intraoffice trunks 6 and 11, originating registers 7 and 12 and common control circuits 8 and 13 be similar to the corresponding apparatus disclosed in the Busch patent.

The interrelation and function of equipment units of the exemplary embodiment will now be described with reference to FIG. 1 wherein the interconnections between circuit blocks have been designated by means of arrows to show the direction of circuit action. A station S1, which is provided with the station controlled conference feature, is connected over a line L1 to switching circuit 1. Switching circuit 1 provides a regular and an auxiliary appearance of line L1 at central office A via lines L1A and L1B which terminate on line link frame 2. Other stations, which are not provided with this feature, such as S2, are connected via their respective lines L2 directly to line link frame 2 at central office A.

Trunk circuits, such as outgoing, incoming and intraoffice trunks 4, 5 and 6, respectively, are shown with originating register 7 as being terminated on trunk link frame 3 of telephone central office A. As is fully disclosed in the Busch patent, lines terminated on line link frames and circuits terminated on trunk link frames are interconnected by means of crossbar switches on these frames and by interframe junctors. All such interconnections are affected under control of a common group of circuits including marker and other common control circuits 8.

Telephone Central Office A is shown connected to Telephone Central Office B by trunk conductors T14 and T15. Central Office B is arranged as described for Central Office A.

Reference will now also be made to FIG. 2 in order to describe in detail the invention as portrayed in the illustrative embodiment.

In order to facilitate the presentation of the detailed disclosure, the circuit description has been subdivided as follows:

I. Calling Connection from Station S1 to Station S4;
II. Adding a Third Station to the Existing Connection;
III. Station to be Added Doesn't Answer or Busy or Overflow Tone is Returned;
IV. Call Terminating at Station S1;
V. Passing the Call on to the Added Station;
VI. Conference Feature Control by Each of the Two Original Parties to a Connection;
VII. Station S1 Equipped with a Non-Dial Pulse Subset;
VIII. Multiparty Lines Equipped with Conference Call Feature;
IX. Disabling the Station Controlled Conference Feature; and
X. Control of Conference Feature by a Station Arranged for Manual Service.

I. CALLING CONNECTION FROM STATION S1 TO STATION S4

When the subscriber lifts the telephone receiver to initiate a call at station S1, FIG. 2, the T and R leads of line L1A are closed through to the regular appearance at line link frame 2 via closed switchhook contacts SW1 and released brake contacts E3 and E4. As described in the Busch patent, a line circuit is energized on line link frame 2 and causes line L1A to be connected to an idle marker 8, FIG. 1. Marker 8 then operates crossbar switches on frames 2 and 3 to establish a communication channel between line L1A on line link frame 2 and originating register 7 on trunk link frame 3. Control of the connection is transferred to originating register 7 by marker 8 which thereupon releases. Originating register 7 provides ground on the S lead of the calling line circuit, FIG. 2, and transmits dial tone to indicate that dialing may begin as disclosed in detail in the Busch patent. Relay A operates at this time under control of the ground provided on the S lead from originating register 7 through closed switch M and normal break contacts ST1 and C4 to negative battery on the winding of relay A. Dial pulses are then transmitted from station S1 to the register in the conventional manner. Relay B is a marginal relay and as such would normally respond to the openings of line L1 during such dial pulses. However, relay B has also been selected to be slow operate and therefore does not operate during these momentary openings of line L1 generated at station S1.

As described in the Busch patent, at the completion of dialing register 7 calls in marker 8, transfers to the marker the dialed information indicating the called number, and then releases. Assuming at this time that the called station is S4 of FIG. 1, marker 8 establishes a communication path from line L1A to outgoing trunk 4 on trunk link frame 3. Outgoing trunk 4 is connected via trunk conductors T14 to incoming trunk 10 appearing on trunk link frame 15 of Central Office B. A conventional incoming call to station S4 is established as set forth in the Busch disclosure.

Assuming that station S4 answers, a communication path then exists between station S1 of Central Office A and station S4 of Central Office B.

It should be recognized at this point in our disclosure that no positive circuit action differing from the Busch disclosure has taken place, other than the operation of relay A in FIG. 2.

II. ADDING A THIRD STATION TO THE EXISTING CONNECTION

Assuming that station S1 desires to add a third party to the established connection, the circuit functions as follows:

To enable the add-on function, the switchhook at station S1 is flashed once. Marginal relay B operates via operated make contact A2 during the open loop portion of the switchhook flash from the change in potential across the T and R leads of line L1A. This change in potential occurs because the resistance manifested by the line conductors leading to station S1 are removed from the existing D.C. circuit during the open loop portion of the switchhook flash. Relay B, in operating, closes make contact B1 thereby operating relay E which locks, via contact E2, to the ground on the S lead.

The operation of relay E performs two major functions. Make contact E1 in closing places resistance R across the T and R leads of line L1A, which releases relay B and acts as a shunt across line L1A to hold the established connection to station S4. Operated transfer contacts E3 and E4 open the T and R leads of line L1 toward line L1A and transfer these T and R leads to line L1B. Thus, at this point, the originally established connection to station S4 is held via holding resistance R, and the closed loop from station S1 via line L1 is continuous through line L1B to the auxiliary line appearance on line link frame 2.

As described for the regular appearance in the preceding Section I, the closed loop at the auxiliary appearance causes register 7 to be connected to line L1B and dial tone is returned to station S1. Relay C, FIG. 2, operates at this time via ground on conductor S. As described before with reference to FIG. 1, register 7 calls in marker 8 upon the completion of dialing and transmits to it the digits of the called station.

Assuming for the sake of simplicity that the called station is station S2 of FIG. 1, a connection is then established by marker 8 between station S1 and station S2 via intraoffice trunk circuit 6 which is terminated on trunk link frame 3. This connection is established as disclosed in the Busch patent and ringing, which is audible at station S1, is applied to station S2. Answer of the call at station S2 causes the completion of a communication path between that station and station S1. Conversation may then take place between these stations in secrecy with respect to station S4 since operated break contacts E3 and E4 of FIG. 2 have interrupted the continuity of line L1A thereby separating line L1A from L1 and L1B.

The switchhook at station S1 is flashed once again, in order to add station S2 to the previously established connection. At this time marginal relay D will operate through operated make contact C5 during the on hook interval of the flash from the change in potential across the T and R leads of line L1B. Operated make contact D3 completes the relay F operate path which may be traced from negative battery through resistance T, the winding of relay F, D3, and normal break contact A4 to ground on the S lead. Relay F locks to this ground via operated make contact F5.

Relay F, in operating, closes make contacts F3 and F4 thereby connecting the T and R leads of line L1B to the T and R leads, respectively, of line L1. Operated make contact F2 releases relay E. Relay E, in releasing, opens make contact E1 and transfer contacts E3 and E4 thereby removing holding resistance R from line L1A and connecting together the T and R leads of lines L1B and L1A which are therefore continuous through F3 operated, E3 released and F4 operated, E4 released, respectively. Thus, stations S1, S2 and S4 of FIG. 1 are in telephonic relation with each other and conversation in conference fashion may ensue.

III. STATION TO BE ADDED DOESN'T ANSWER OR BUSY OR OVERFLOW TONE IS RETURNED

A situation may arise where, in attempting to add a third station, that station may be busy or may not answer. Another situation may occur wherein an all-trunks busy or trouble condition may prevail. In the event of any such occurrence, station S1 would find it necessary to abandon the attempt in order to try again or perhaps to locate the third party at a different station.

The special service subhcriber's action and the circuit functioning would proceed as described above in Section II to the point where ringing applied to station S2 is audible at station S1, or as noted above, a busy, trouble, or all trunks busy condition is encountered which causes an appropriate audible signal other than ringing to be transmitted to the calling subscriber.

In any event, to abandon this part of the connection the calling subscriber would flash his switchhook twice. During the on hook interval of the first flash, marginal relay D operates and operates relay F as described in Section II. The operation of relay F closes make contact F1 thereby partially completing the operate path of relay A, which was released via C4 upon the initial operation of relay C at the auxiliary appearance. Relay A reoperates during the return-to-off hook portion of the switchhook flash since the D relay restores to normal, thereby releasing break contact D2 which completes the operate path of relay A. Relay A then locks up under control of operated make contacts C4 and A3 to ground to provide a memory of the fact that the D relay has operated and released once.

Upon flashing the switchhook a second time relay D reoperates during the on hook portion of the flash and completes the operate path of relay RD from negative battery through operated make contact C2, the RD winding, operated make contact C3, normal break contact ST5, and operated make contacts A1 and D1 to ground. Relay RD locks operated to ground via make contact RD1 to record the fact that relay D has operated a second time. Operated make contact RD3 partially completes the obvious shunt release path of relay F which is completed with the release of break contact D4 when relay D releases during the return-to-off hook portion of the second switchook flash.

The initial operation of relay F released relay E via operated make contact F2, thereby restoring transfer contacts E3 and E4 thus leaving the line L1 and L1B connected under control of make contacts F3 and F4. Contacts F3 and F4, in restoring to normal by the release of relay F, open line L1B at the auxiliary appearance thus removing a request for service via this appearance at this time. Relay C releases since ground is removed from the S lead as described in the Busch patent. The release of relay C releases relay RD and permits relay A to reoperate via break contact C4, thereby restoring the circuit to normal.

Station S1 is now connected through to station S4 as described at the beginning of Section II. Station S1 may reinitiate the add-on call as desired.

It is, of course, evident from the above description that in the event the third party answers, station S1 may cause the release of that party at any time after completion of the connection by flashing the switchhook a total of two times. For instance, the first flash will permit a conference connection to be established as described in Section II, a subsequent flashing of the switchhook causes release of the third party as described above in this section.

IV. CALL TERMINATING AT STATION S1

Sections I, II and III describe the manner in which station S1 controls the conference feature when the initial connection is originated from station S1. This section will describe the manner in which this control is accomplished by station S1 when the initial connection is terminated to that station.

Assuming for the sake of simplicity that station S2, FIG. 1, desired to establish a connection to station S1. As fully disclosed in the Busch patent, station S2 would be connected to station S1 through intraoffice trunk 6 of trunk link frame 3 via operated crossbar switches on line link frame 2 and trunk link frame 3, and the interframe junctors.

Referring now to FIG. 2, when the connection is established to the regular appearance of station S1, ground is applied to the S lead as described in the Busch patent. This ground is applied to the winding of relay A through ST1 and C4 break contacts normal, thereby operating relay A. Upon the first application of ringing to line L1A, ringing detection relay RD operates from the ringing current applied through C1 break contact normal, capacitor K, and the bridge circuit composed of diodes W, X, Y, and Z.

The operation of relay RD closes make contact RD1, thereby operating the start timing relay ST by providing ground through released break contact C6 to the winding of relay ST. The ST relay locks operated through operated make contact ST2 and released break contact C6 and D6, and also releases relay A via operated break contact ST1. Make contact A2 is thus restored to normal opening the operate path or relay B.

The release of relay RD at the completion of the first ringing cycle restores break contact RD2 which provides ground through operated make contact ST3 to cause gas tube timer G of well-known configuration to begin timing. The beginning of the next ringing cycle reoperates relay RD and disables timer G via operated break contact RD2. This cycle is repeated until station S2 disconnects or station S1 answers at which point ringing is tripped and relay RD ceases to reoperate, the gas tube timer then completes its operate interval and shunt releases relay ST by providing ground to the common point between the winding of ST and resistance V.

Relay ST, in releasing, permits relay A to reoperate through the normal break contact ST1, thereby placing marginal relay B across the T and R leads of line L1A via operated make contact A2.

At this time stations S2 and S1 are connected by a communication path through the regular appearance of line L1, and station S1 may now control the conference function exactly as described in the previous sections.

V. PASSING THE CALL ON TO THE ADDED STATION

Situations often occur, particularly in the business field, wherein a call is received at a station, such as S1, and the called party is unable to be of assistance to the calling party and therefore wishes to transfer or pass the call to another station.

Assuming the calling party to be station S2 of FIG. 1 and the called party to be station S1, the call would progress exactly as described in Section IV to the point where station S1 answers. At this time, station S1 may desire to pass the call to station S4. The call would proceed as described in Section II for adding another station to the point where the three parties are connected in conference fashion. Station S1 may then restore the subset to normal, opening switchhook contacts SW1. Since lines L1A and L1B are continuous as set forth in Section II, the connection remains established under control of either of the remaining parties.

When station S1 goes on-hook to pass the call, relay D will reoperate. Relay RD will operate at this time as described before in Section III for the on-hook portion of a second switchhook flash. Since station S1 will remain on-hook for some time to permit stations S2 and S4 to complete their conversation, means have been provided to prevent a premature off-hook by station S1 from causing the release of station S4 via the release of relay D. The release of relay D would otherwise appear as the end of a second switchhook flash by station S1.

When station S1 goes on-hook to pass the cell, relay D operates and closes make contact D5, thereby providing ground through operated make contacts D5 and A6, transer contact A7 and normal break contact ST4 to enable gas tube timer G via the negative battery provided through resistance V and the winding of relay ST. After a predetermined interval, gas tube timer G operates completing the operate path of relay ST which locks operated through operated transfer contacts D6 and break contact ST2. Break contact ST4 operates at this time restoring gas tube timer G to normal.

Relay ST, in operating, releases relay RD via break contact ST5. Thus, if station S1 rejoins the connection prematurely, relay D will release opening the locking path of relay ST permitting it to release, and also restoring the operate path of relay RD for subsequent use in counting a second switchhook flash, if station S1 should so desire.

It will be noted by an inspection of FIGS. 1 and 2 that, since lines L1A, L1B and L1 are connected together during an established conference call, either stations S2 or S4 may withdraw and allow the connection to remain established between stations S1 and S4, or between stations S1 and S2.

VI. CONFERENCE FEATURE CONTROL BY EACH OF THE TWO ORIGINAL PARTIES TO A CONNECTION

A situation may arise where two stations are initially connected in the conventional manner, and each station is provided with the conference control feature.

Referring to FIG. 1, assume that the two original parties are stations S1 and S3, each of which is provided with a switching circuit. As indicated earlier, FIG. 2 shows in detail the circuitry contained in switching circuit 1. It is to be noted that switching circuit 2, shown connected to station S3 in FIG. 1, contains the exact circuit configuration as shown for switching circuit 1 in FIG. 2.

For simplicity we shall assume that station S1 initiates a call to station S3 and subsequently station S1 adds station S2 to the connection and station S3 adds station S4 to the connection.

Station S1 initiates the call to station S3 in the same manner as described for a call to station S4 in Section I. Station S3 responds to the call as described in Section IV for terminating a call to station S1. Upon completion of the initial connection between stations S1 and S3, they may each successively or simultaneously add an additional party, such as parties S2 and S3, exactly as described for station S1 in Section III.

It is, of course, obvious that these added lines may, if so equipped, add additional lines to the connection. Amplifying means well known in the art may be provided to keep the conversation at a suitable audio level.

VII. STATION S1 EQUIPPED WITH A NON-DIAL PULSE SUBSET

The circuit description has thus far concerned itself with a discussion of the functioning of the invention wherein the stations are equipped with dial pulse generating subsets. It is well known in the art today that other subsets, such as pushbutton multifrequency subsets, may be provided with suitable receiving means at the central office.

In such an instance it should be noted by reference to FIG. 2 that the invention will function exactly as described hereinbefore. The only distinction being that a register with multifrequency receiving means would be attached to the line during the dial tone connection. Generation of the multifrequency pulses at the subset in the well-known manner would cause the circuitry to respond as described before for dial pulses. And the control of the conference function would remain under control of switchhook flashes only, as determined by the special service subscriber.

VIII. MULTIPARTY LINES EQUIPPED WITH CONFERENCE CALL FEATURE

In many areas of the country, multiparty service is made optionally available to telephone subscribers because of a restricted need on their part for telephone service, and also such service is sometimes mandatory because of the unavailability of telephone facilities to supply the demand.

The invention in such cases may be shared by the parties on a multiparty line. Referring to FIG. 1, station S– connected in parallel to station S1 by line L– is shown to typify one of such parties. It is obvious, of course, that a greater number of such stations may be provided in parallel with line L1 in the well-known manner.

Station S– will control the conference features exactly as described hereinbefore for station S1.

IX. DISABLING THE STATION CONTROLLED CONFERENCE FEATURE

Situations may occur where a line L1 though equipped as shown in FIG. 2 will be associated with a station S1 not desiring the special services at all or perhaps requiring that it be disabled for a limited interval. In such a situation the invention may be rendered unavailable for use by such nonprivileged stations merely by opening the sleeve lead at the regular appearance. As shown in FIG. 2 this may be advantageously accomplished by disconnection of the lead or via switch M.

X. CONTROL OF CONFERENCE FEATURE BY A STATION ARRANGED FOR MANUAL SERVICE

Manual service is an arrangement often provided in the past whereby, because of central office equipment limitations, a station would be equipped with a subset possessed of no signaling means other than the conventional switchhook. An offhook condition at the subset alerted an associated switchboard position for completion of the call. Today, in most modern central office areas, signalling is controlled directly from the subset by a dial or pushbuttons. However, arrangements have been made in such modern central offices for a manual class of service, since such service is still required by certain subscribers because of physical incapacity, and also because certain emergency stations have a need for immediate connection to an operator.

Referring to FIG. 2 and assuming that station S1 is so arranged for manual service, it will be recognized that a call originating at station S1 would establish a call and be connected to a station such as S4 of FIG. 1 in the same manner as described in Section I. The only distinction is that when originating register 7 is connected to station S1, no digits are dialed at station S1, but rather the "zero" operator relay in the register operates from the manual class of service relay as set forth in detail in the Busch patent. An operator position is thereupon connected to station S1 and per verbal instructions establishes a connection to station S4. It is obvious that additional stations may be added to the connection by the operator upon a request from station S4. Thus on a call originating from a manual station, the use of the invention is not required since an operator supervises the entire connection.

However, a call which terminates to station S1 does not require nor receive operator assistance and therefore the invention would perform as follows: A call terminating to station S1 would be completed exactly as described in Section IV. Upon ascertaining that a third station should be added to the connection, the circuit would function as described in Section II to the point where a register is connected to the auxiliary appearance. At this time, the "zero" operator relay operates as described above and causes a connection to be established to an operator position. Upon verbal instructions from station S1, the additional station is connected to the auxiliary appearance in the conventional way. Station S1 would then complete the conference connection exactly as described in Section II. Call passing and dismissal of the added station by station S1 would be accomplished as described in Sections V and III, respectively.

While the equipments of this invention have been described with reference to a particular embodiment in an arrangement whereby the special service feature is shown as being controlled by one or more subscribers for inter-subscriber communication, it is to be understood that such an embodiment is intended to be illustrative of the principles of the invention and that numerous other arrangements may be devised by those skilled in the art without departing from the spirit and scope of the invention.

For example, the invention may be used where two stations, each of which is equipped with the invention, may desire to add data processing machines to their respective ends of the connection and then both withdraw from the connection allowing it to remain established between these machines.

Another example would be where either or both of such subscribers may desire to add to the connection voice recording equipment to provide a permanent record of the conversation.

A further example would be where a preference and lockout arrangement well known in the art is employed to permit a lesser plurality of subscriber controlled conference circuits to be common to a greater plurality of stations thereby allowing the invention to function on a common control basis.

What is claimed is:

1. In a telephone system, a plurality of lines, a special service line, switching means comprising means for alternatively establishing outgoing connections and incoming connections between said special service line and any of said plurality of lines, and special service means controlled by said special service line for adding another one of said plurality of lines to any of said established connections.

2. In a communication system, a plurality of lines, means for establishing connections between pairs of said lines, and special service means controlled by one of said lines for adding another line to an established connection involving said one line irrespective of whether said one line originated or terminated the established connection, said special service means comprising means for causing said added line to be connected in privacy to said one line prior to being added to said established connection.

3. The combination set forth in claim 2 wherein said special service means further comprises means controlled by said one line for releasing said added line from said established connection.

4. The combination set forth in claim 2 wherein said special service means is responsive only to a signal from said one line which is longer in duration than the corresponding interval produced by a dial-pulse.

5. In a telephone system, a plurality of lines, means for establishing a connection between a pair of said lines, and distinct special service means respectively associated with each of said pair of lines, said special service means comprising means controlled by said pair of lines for concurrently adding other lines to said established connection.

6. In a telephone system, a plurality of lines, means for establishing a connection between a pair of said lines, and distinct special service means respectively associated with each of said pair of lines, said special service means comprising means for connecting said pair of lines to others of said lines, means for adding said other lines to said established connection in response to signals from said pair of lines, and means for maintaining said established connection under control of any two of said lines active in said established connection.

7. In a telephone system, a plurality of multi-station lines, means for establishing a connection between a pair of said lines, and special service means associated with each of said pair of lines, said special service means comprising means controlled by any active station on each of said pair of lines for connecting either of said pair of lines to others of said lines independent of and isolated from said established connection, means controlled by said active stations for adding said other lines to said established connection in response to signals from said active stations, and means for maintaining said established connection under control of any two of the interconnected lines upon removal of any of the lines from said established connection.

8. The combination set forth in claim 7 wherein said special service means further comprises means controlled by said active stations and responsive to signals from said active stations for releasing said added lines.

9. In a telephone system, a plurality of lines, central office means for establishing a connection between a pair of said lines, and special service means associated with each of said pair of lines, said special service means comprising means for connecting either of said pair of lines to others of said lines independent of and isolated from said established connection, means for adding said other lines to said established connection in response to signals from said pair of lines, said signals each comprising an on-hook condition interval on either of said pair of lines longer in duration than that caused by a dial pulsed digit one, means for maintaining said established connection under control of any two of the interconnected lines upon removal of any of the lines from said established connection and means responsive to said signal from one of said pair of lines for releasing one of said other lines from said established connection.

10. In a telephone system, a plurality of lines, means for establishing a connection between a pair of said lines, and distinct special service means comprising means respectively controlled by each of said pair of lines for connecting each of said pair of lines to other of said lines independent of and isolated from said established connection, means for adding said other lines to said established connection in response to signals from said pair of lines, means for maintaining said established connection under control of said added lines after removal of said pair of lines from said established connection, and means for permitting either or both of said pair of lines to rejoin said established connection.

11. In a telephone system, a plurality of lines, central office means for establishing a connection between a pair of said lines, and special service means associated with each of said pair of lines, said special service means comprising means for connecting either of said pair of lines to others of said lines independent of and isolated from said established connection, means for adding said other lines to said established connection in response to signals from said pair of lines, means for maintaining said established connection under control of any two of the interconnected lines upon removal of any of the lines from said established connection, and means responsive to a signal from one of said pair of lines for releasing one of said other lines from said established connection.

12. A telephone system comprising a switching office, a plurality of subscriber lines connected to said office, a subset, a switching circuit having a regular and auxiliary appearance at said switching office, a subscriber line connecting said subset to said switching circuit, means in said subset for applying first and second signals to said line, connecting means at said office seizable from said regular appearance and responsive to first signals from said subset for establishing a connection from said regular appearance of said switching circuit to a first one of said plurality of lines, said switching circuit comprising first means operative in response to a signal from said connecting means to indicate that said connecting means has responded to a request for service from said subset, second means controlled by said first means and operative only in response to said second signals for activating said switching circuit, third means controlled by said second means and comprising means for maintaining said established connection from said regular appearance and initiating a bid for reseizure of said connecting means from said auxiliary appearance, fourth means operative in response to a signal from said connecting means to indicate that said connecting means has again responded to a request for service from said subset, said connecting means further comprising means responsive to further first signals from said subset for establishing a connection to a second one of said plurality of lines, said third means further comprising means for causing said established connection to said second line to be private and independent of said established connection to said first line, fifth means enabled by said fourth means and responsive to second signals from said subset for causing said established connection to said first line to be connected to said established connection to said second line, and sixth means operative in response to further second signals from said subset for disconnecting said established connection to said second line from said established connection to said first line.

13. A telephone system according to claim 12, wherein said second means further comprises distinct means unresponsive to dial pulses on said line connecting said subset to said central office and responsive to an on-hook condition of said subset.

14. A telephone system, according to claim 13, wherein said distinct means further comprises a slow-operate, marginal relay for controlling said third means.

15. A telephone system according to claim 12, wherein said fifth means further comprises distinct means unresponsive to dial pulses on said line connecting said subset to said central office and responsive to an on-hook condition of said subset.

16. A telephone system, according to claim 15, wherein said distinct means further comprises a slow-operate marginal relay.

17. A telephone system according to claim 12 further comprising memory means for recognizing and recording that said fifth means has been activated a second time by said second signals from said subset.

18. A telephone system according to claim 17 wherein said memory means further comprises a relay controlled by said first, fourth, and fifth means for activating said sixth means to disconnect said established connection to said second line from said established connection to said first line.

19. A telephone system according to claim 12 further comprising means enabling said first and second lines to maintain said established connections upon a temporary on-hook condition on said line connecting said subset to said switching circuit.

20. A telephone system according to claim 19 further comprising a timing circuit, and inhibiting means controlled by said first and fifth means and said timing circuit for disabling said sixth means.

21. A telephone system comprising a plurality of subscriber lines, switching means having a plurality of line appearances thereon, and special service means for connecting one of said lines to a pair of said line appearances; said special service means including means when said line is connected to a first of said appearances for disconnecting said line from said first appearance, connecting said line to the second of said appearances, and bridging said first appearance in response to a first signal from said line; means for removing the bridging of said first line appearance and reconnecting said line to said first appearance while still connected to said second appearance in response to a second signal from said line; and means for disconnecting said line from said second appearance in response to a third signal from said line.

22. In a telephone system, a plurality of lines, a particular line arranged for manual outgoing service and automatic incoming service, means for establishing a terminating connection to said particular line from one of said plurality of lines, and special service means controlled by said particular line for adding another line to said established connection.

23. The combination set forth in claim 22 wherein said special service means further comprises means for causing said particular line to be independently connected to said other line prior to adding said other line to said established connection.

24. The combination set forth in claim 22 wherein said special service means further comprises means controlled by said particular line for releasing said added line from said established connecition.

References Cited by the Examiner

UNITED STATES PATENTS

| | | | |
|---|---|---|---|
| 1,312,778 | 8/1919 | Clausen | 179—18 |
| 2,958,734 | 11/1960 | Forrest | 189—18 |

ROBERT H. ROSE, *Primary Examiner.*

WILLIAM C. COOPER, *Examiner.*